(12) United States Patent
McCormack et al.

(10) Patent No.: US 6,854,015 B2
(45) Date of Patent: Feb. 8, 2005

(54) SYSTEM FOR ISOLATING ETHERNET NETWORK TRAFFIC

(75) Inventors: Michael S. McCormack, Gloucester, MA (US); Paul Dryer, Andover, MA (US); Steve Weeks, North Andover, MA (US)

(73) Assignee: 3Com Corporation, Santa Clara, CA (US)

( * ) Notice: Subject to any disclaimer, the term of this patent is extended or adjusted under 35 U.S.C. 154(b) by 820 days.

(21) Appl. No.: 09/796,398

(22) Filed: Feb. 28, 2001

(65) Prior Publication Data

US 2002/0120739 A1 Aug. 29, 2002

(51) Int. Cl.[7] .............................................. G06F 15/16
(52) U.S. Cl. ...................... 709/227; 709/222; 709/228; 709/250; 709/234; 709/238; 709/239; 709/244; 710/106; 710/300; 710/301; 710/309; 370/389; 370/445; 370/462; 370/463; 379/167.11; 379/221.01; 379/93.14
(58) Field of Search ................................ 709/222, 227, 709/228, 250, 239, 234, 238, 244; 710/106, 300, 301, 309; 370/389, 445, 462, 463; 379/167.11, 221.01, 93.14

(56) References Cited

U.S. PATENT DOCUMENTS 5,596,569 A * 1/1997 Madonna et al. ........... 370/217
6,483,902 B1 * 11/2002 Stewart et al. ........... 379/90.01

* cited by examiner

Primary Examiner—Ario Etienne
Assistant Examiner—Yves Dalencourt
(74) Attorney, Agent, or Firm—McGlew and Tuttle, P.C.

(57) ABSTRACT

A card, particularly a digital line card is provided for use with a chassis having a slot for receiving the digital line card. The chassis has an Ethernet bus for receiving packets from the line card and has a power supply and power strip for supplying power to the line card. The line card includes a public switched telephone network (PSTN) digital line input/output interface for sending digital signals over the PSTN and for receiving digital signals from PSTN. A line card control processor is connected to the digital line input/output interface. An Ethernet input/output is provided for sending packets over a local network corresponding to signals received from the telephone line and for receiving packets from the local network and forwarding received signals to the digital line input/output interface. The Ethernet input/output has a controllable backplane interface to the Ethernet bus including a switch normally active to direct data flow between the line card and the Ethernet bus, an Ethernet transceiver connectable to an Ethernet network, and an Ethernet link signal detector for detecting an Ethernet link signal at the Ethernet transceiver and deactivating the switch to isolate the line card from the Ethernet bus and to force data flow through the Ethernet transceiver. The card may also be part a network system with a chassis having a backplane Ethernet bus.

16 Claims, 3 Drawing Sheets

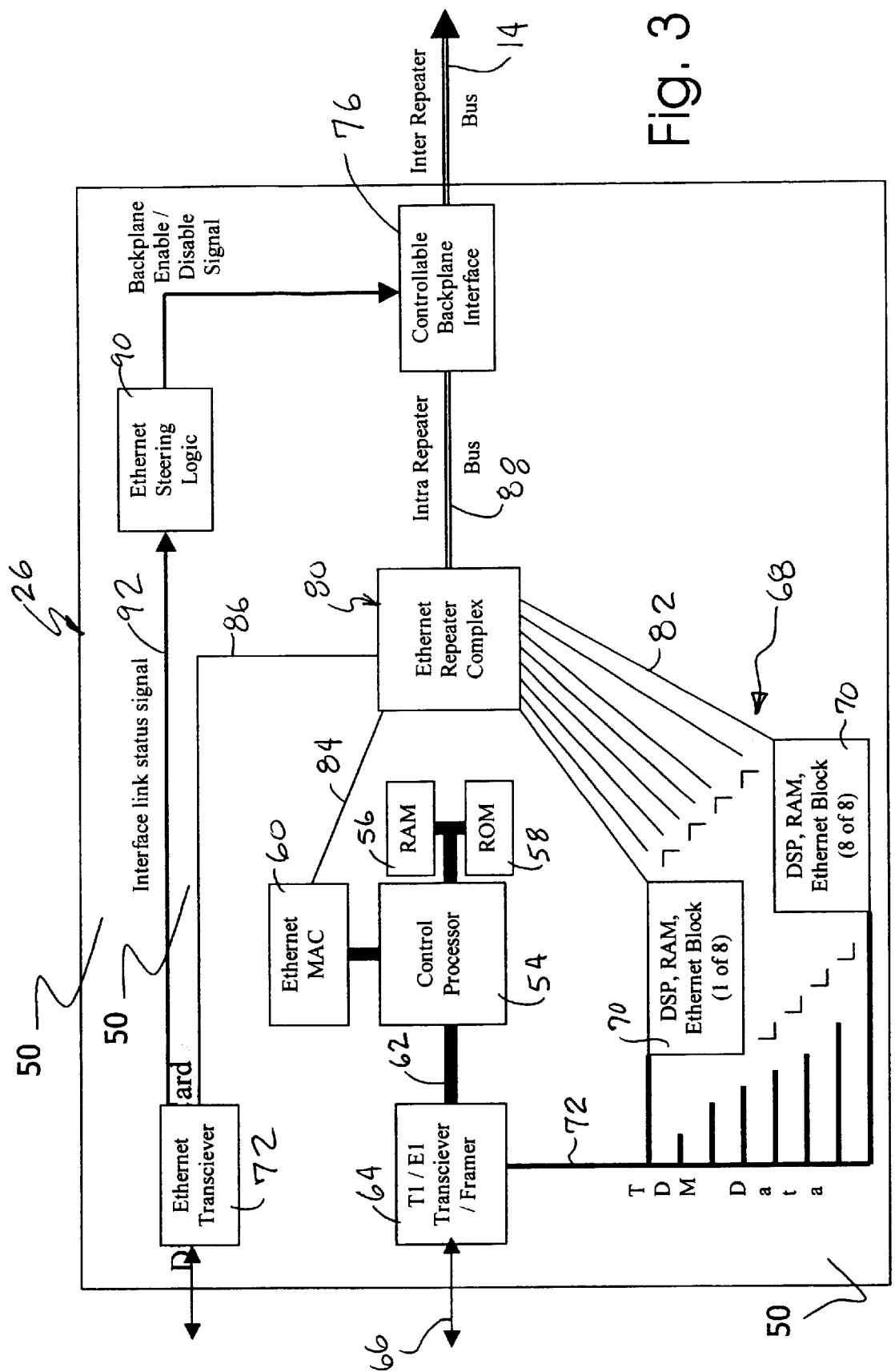

SYSTEM FOR ISOLATING ETHERNET NETWORK TRAFFIC

FIELD OF THE INVENTION

The invention relates generally to data network systems that include one or more cards which may be provided in slots of a chassis, in which the chassis provides a backplane allowing communication between the cards and also preferably for providing power to the cards. The invention also relates to telephone systems and private branch exchange (PBX) systems and distributed telephone network systems such as network to public switched telephone network (PSTN) interfaces such as networks with a component connected to the PSTN and with network connections to user network telephone units or other user network devices.

BACKGROUND OF THE INVENTION

Telephone systems are known which provide a common interface between a plurality of users and a public telephone network. These systems have been referred to as PBX systems. A typical PBX system includes a central box with line cards providing connections to assigned lines of the PSTN network. The central box is connected by wires such as twisted pair wires to individual telephone units. The connection from the central box to the telephone units may be by way of analogue or digital signals. More recently, digital signals are sent by the central unit to the phone units. The digital signals include voice data as well as control and messaging data. The units typically include a simple handset as well as a speaker for paging, intercom type communications and speaker phone applications. Typically the base unit also includes a microphone. The handset is a typical handset providing a speaker and a microphone.

Telephone systems using distributed networks, such as local area networks (LANs) are also generally known. With these systems, a distributed network is provided, such as carrier sense multiple access with collision detection (CSMA/CD) (see IEEE 802.3) generally known as Ethernet. A telephone network system is provided with a central box having line cards connected to the distributed network as well as network devices connected to the network. The network devices include network telephones with, for example, a base unit with a speaker and a microphone and a handset (with a speaker and a microphone). Data packets are sent over the network between network devices. A network control processor or network call processor (NCP) may be used to monitor and control the access to the PSTN and other connections.

Systems may be provided with a system network chassis or box that provides power to various units such as the NCP, line cards and for example other cards such as a system network card. The chassis may typically include a backplane with a power bus and with an Ethernet bus providing a communication path between the NCP and the line cards and the system network card (if any). The system network card may be connected to the Ethernet network with other network devices similarly connected to the Ethernet network. Traffic between the NCP and the line cards passes over the Ethernet bus provided in the chassis. Traffic to the other network devices, such as to network telephones, is sent from the Ethernet bus of the chassis to the Ethernet network. The Ethernet network is established for example with a 10BaseT implementation of IEEE 802.3 Ethernet over unshielded twisted pair wiring with RJ connectors with each node connected to a central wiring center (a hub, router, switch etc.). The implementation may be for example both Ethernet and fast Ethernet (data transfer rate of 100 Mbps).

The use of a chassis with a backplane presents significant advantages with regard to using modular components. Different components may be added and removed, allowing swapping and changing. The backplane provides further communication paths between the modular components. However, the backplane Ethernet path presents a limitation as to the use of the chassis for cards which require a great deal of bandwidth.

SUMMARY AND OBJECTS OF THE INVENTION

It is an object of the invention to provide a card for connection to a chassis via a slot of the chassis, wherein the card has an interface to an Ethernet bus supported by the chassis and also includes an Ethernet transceiver and wherein the card detects a connection at the Ethernet transceiver and disconnects the card at the interface to the Ethernet bus to force data to flow through the Ethernet transceiver.

It is another object of the invention to provide a digital line card which includes an interface to an Ethernet bus with a normally active switch to direct data flow from the digital line card to the Ethernet bus interface and with an Ethernet transceiver wherein upon the line card detecting an Ethernet link signal at the Ethernet transceiver the switch is deactivated to force data flow through the Ethernet transceiver.

Is a further object of the invention to provide a system and network method using a chassis having a backplane with an Ethernet bus with the chassis having slots receiving cards including a control processor card and another card, wherein the one card includes connection features including a controllable connection to the backplane Ethernet bus as well as an Ethernet transceiver for connection to an Ethernet network.

According to the invention, a card, particularly a digital line card is provided for use with a chassis having a slot for receiving the digital line card. The chassis has an Ethernet bus for receiving packets from the line card and has a power supply and power strip for supplying power to the line card. The line card includes a public switched telephone network (PSTN) digital line input/output interface for sending digital signals over the PSTN and for receiving digital signals from PSTN. A line card control processor is connected to the digital line input/output interface. An Ethernet input/output is provided for sending packets over a local network corresponding to signals received from the telephone line and for receiving packets from the local network and forwarding received signals to the digital line input/output interface. The Ethernet input/output has a controllable backplane interface to the Ethernet bus including a switch normally active to direct data flow between the line card and the Ethernet bus, an Ethernet transceiver connectable to an Ethernet network, and an Ethernet link signal detector for detecting an Ethernet link signal at the Ethernet transceiver and deactivating the switch to isolate the line card from the Ethernet bus and to force data flow through the Ethernet transceiver. The card may also be part a network system with a chassis having a backplane Ethernet bus.

The card or line card may also include a digital signal processor (DSP) complex. This may be a plurality of DSPs receiving time division multiplexed data from the input/output interface with media access controllers (MACs) connectd to the DSPs. A MAC is connected to the line card control processor. The Ethernet input/output or Ethernet channel further includes an Ethernet repeater complex connecting the MACs connected to the DSPs and the MAC connected to the line card control processor to each of the Ethernet transceiver and the controllable backplane interface.

The Ethernet link signal detector may also include Ethernet steering logic connected to the Ethernet transceiver for detecting an interface link status signal and connected to the controllable backplane interface and generating a backplane enable/disable signal for enabling the controllable backplane interface switch to send packets from each of the MACs connected to the DSPs and the MAC connected to the line card control processor and for disabling the controllable backplane interface switch to isolate the line card from the Ethernet bus. The controllable backplane interface switch may be comprised of a plurality of FET switches which are normally active and normally route Ethernet traffic to the Ethernet bus.

The card is advantageously a line card with a digital line input/output interface in the form of a T1/E1 transceiver and framer providing a T1/E1 interface to the outside PSTN.

The card may have a digital signal processor complex with multiple DSPs (e.g. six to eight DSPs) along with associated Program and Data random access memory units (RAMs) as well as two Ethernet MACs per DSP.

The Ethernet transceiver preferably includes a 10 Base-T MDI (or 10 Base-T MDI-X) port for connecting the line card to a Hub, switch or router of the Ethernet network via a patch cord.

According to another aspect of the invention, a network method is provided including using a chassis with slots for receiving cards, the chassis having an Ethernet bus for receiving packets from the cards and sending packets to the cards and having a power supply and power strip for supplying power to the cards. A card is connected to the chassis, that has an Ethernet channel for sending packets over a local network and for receiving packets from the local network. The Ethernet channel includes a controllable backplane interface to the Ethernet bus with a switch normally active to direct data flow between the card and the Ethernet bus. The card also has an Ethernet transceiver connectable to the local network. The card further has an Ethernet link signal detector for detecting an Ethernet link signal at the Ethernet transceiver and deactivating the switch to isolate the line card from the Ethernet bus and to force data flow through the Ethernet transceiver. The process further includes connecting the Ethernet transceiver of the card to a hub, switch or router of the local network via a patch cable, whereby the line card sends packets to the local network via the Ethernet transceiver and the switch of the line card is deactivated to isolate the one of the line cards from the Ethernet bus and to force data flow through the Ethernet transceiver.

An important advantage of the invention is the ability to use a chassis with a backplane providing power and connectivity to connected devices (cards) wherein limitations as to the bandwidth of the chassis will not prevent the use of the chassis with cards which require significant bandwidth connection to the distributed network (the Ethernet network). This is particularly an advantage for a chassis which is primarily designed for traditional line cards with a PSTN line, primarily for providing a voice signal, for example, converted at the line card from a digital signal coming from the network. The same chassis can be used with one or more digital line cards (e.g. for T1 lines—long distance point-to-point circuits, providing 24 channels of 64 Kbps giving a total bandwidth of 1.544 Mbps or an E1 line, namely, a dedicated 2.048 Mbps communications circuit capable of supporting thirty-two 64 Kbps channels used as 30 voice channels, 1 control channel, and 1 synchronization and framing channel—the European equivalent to North America's T1). Some or all of the line card data traffic to the Ethernet network may be directed through the chassis Ethernet bus onto the chassis. As the digital line card is capable of transmitting large amounts of data, additional digital line cards added may bypass the backplane. The invention allows for the installer to selectively connect the digital line cards to the chassis with some line cards providing the connection directly from the front of the line card to the Ethernet network, bypassing the backplane of the chassis. This provides flexibility while still using an existing chassis. This avoids the need to redesign the backplane bandwidth.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a diagram showing features of a digital line card device according to the invention;

DESCRIPTION OF THE PREFERRED EMBODIMENTS

Figure 1:
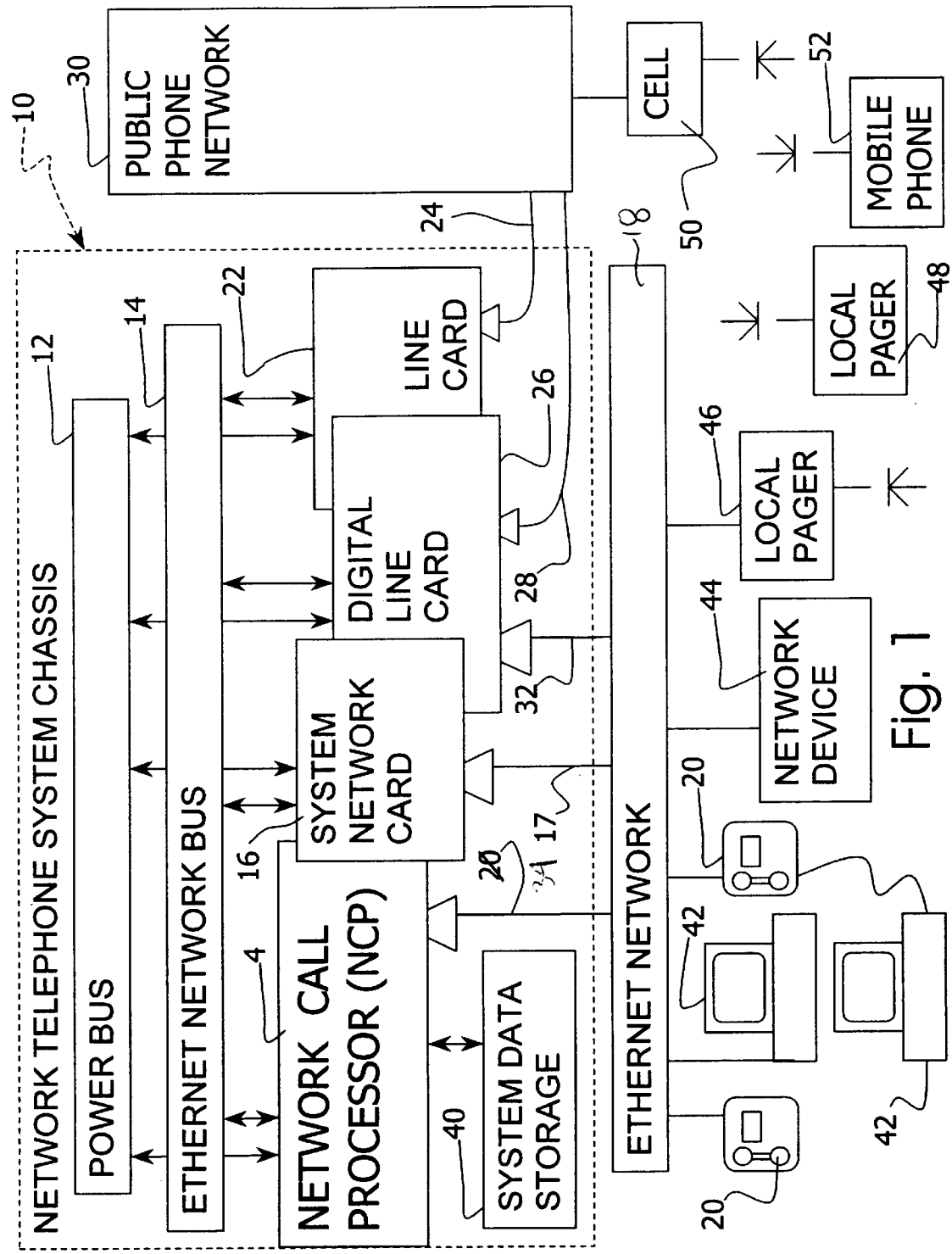
FIG. 1 is a system diagram showing system features according to the invention.

Referring to the drawings in particular, the invention comprises a digital line card 26 which may be used as part of a network telephone system generally designated 1. The system 1 includes a network call processor (NCP) 4. The NCP is a network control processor that monitors the network system 1.

The telephone system 1 is provided as part of a digital distributed network (e.g., a LAN) Ethernet network 18. The network comprises network media (such as twisted pair of various types and categories, cable, infrared, wireless etc.). An embodiment includes twisted pair wiring connected via a hub/router or switch. The network 1 may be established using network software (NOVELL, WINDOWS NT, etc.) run on a server 47 for communication between computers 42 and other network devices 20, 44 and 46.

A preferred embodiment of the invention provides a network telephone system with network telephone devices 20 (e.g. many telephones 20 for many users at a facility). In the embodiment shown the NCP 4 is provided in a network telephone system chassis 10 that provides power through power bus 12 and provides a network connection through the Ethernet chassis repeater bus 14. The NCP 4 is connected to the Ethernet bus 14 and the power bus 12. The system network card 16 provides a connection 17 from the NCP 4 to the Ethernet network 18. The network telephones 20 are connected to the Ethernet network 18 as network devices. A line card 22 may also be connected to the power bus 12 and Ethernet bus 14. The line card 22 is connected to the PSTN (or other data network) 30 as shown at 24. A digital line card 26 may also be provided (e.g., for a T1 line). The digital line card 26 is also connected to the public phone network or other data network 30 as shown at 28. The digital line card 26 is connected to bus 14 and may also be directly connected to the Ethernet network 18 as shown at 32. The NCP 4 may also be connected directly to the Ethernet network as shown at 34.

The particular arrangement shown is not critical to the system of the invention. Any of the units shown in the network telephone system chassis 10 may be provided separately, in a different chassis, or in combination with other network devices. In the embodiment shown in FIG. 1 system data storage 40 is provided connected to the NCP 4. The system data storage 40 can also be provided separately, for example in a network server 47 (see FIG. 2) or in combination with other network devices. The NCP 4 may be connected to multiple data storage facilities. The NCP 4 may be a stand alone unit or it may be in the same chassis as cards 16, 26 and 22, or NCP 4 may be provided with the server 47.

Various network devices can be connected to the Ethernet network 18. These include the network telephones 20, computers 42 and other network devices designated 44. A network device in the form of a local pager 46 may be connected to the Ethernet network 18 to send a radio frequency signal to a local pager device 48. The PSTN 30 is connected to a cellular network 50 which communicates with mobile phones such as mobile phone 52, other phones connected to the public network and other services (e.g., wide area paging). Although specific examples are given, various connections may be made to local area networks and to wide area networks.

Figure 2:
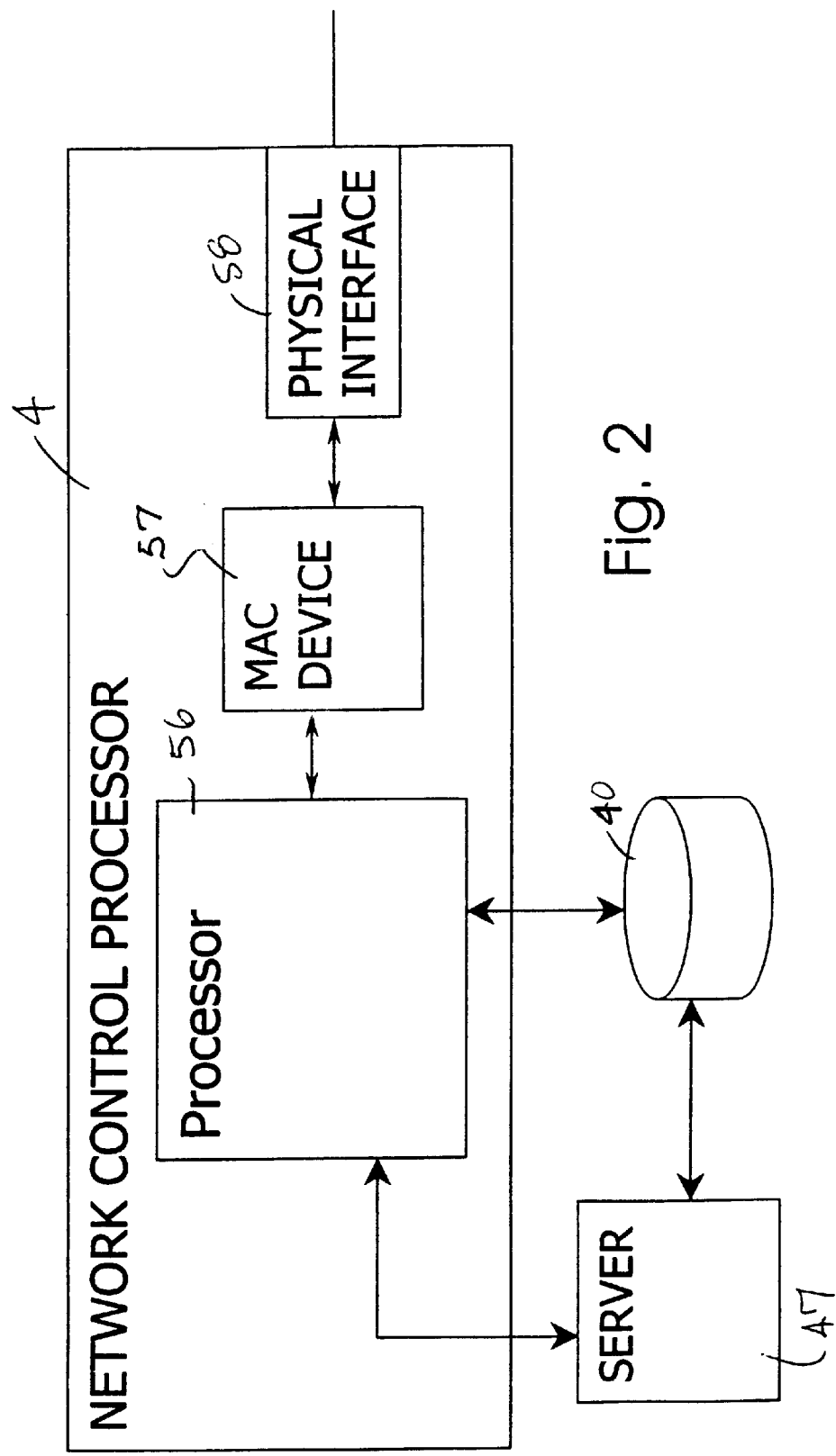
FIG. 2 is a diagram showing features of the network processor, particularly a telephone network call processor.

As shown in FIG. 2, the NCP 4 includes a processor 56 which is connected to system data storage 40. The processor 56 monitors telephone network traffic and other network features. The processor 56 cooperates to establish conference calls and establishes system user data. The processor 56 may also monitor other network functions or may receive packets from other network control devices relating to network functions such as status, errors, faults etc.

The NCP 4 may have a direct connection 34 to the Ethernet network 18 via MAC device 57 and physical interface 58, as shown in FIG. 2 and a connection through Ethernet bus 14. As an alternative to the embodiment shown in FIG. 1, the NCP 4 may be directly connected to a server 47 which itself is connected to the Ethernet network 18. The data storage 40 may be connected to the server.

The network telephone 20 includes a packet controller for receiving packets, sending packets and forwarding packets received from the network 1 to an associated network device 42, when the packet is addressed to the associated device 42. The telephone network device 20 may be used such that two different collision domains (using CSMA/CD) are established, one at the side of the computer system 42 and one at the network 1 (this is explained in applications Ser. Nos. 09/204,102; 09/203,542; and 09/204,107, which are hereby incorporated by reference). The network telephones may be provided as described in U.S. application Ser. No. 09/204,102; and/or U.S. application Ser. No. 09/203,542; and/or U.S. application Ser. No. 09/204,107.

FIG. 3 shows the line card 26 according to a preferred embodiment of the invention The line card 26 includes a processor 4 with a control processor 54 as well as random access memory (RAM) 56 and read-only memory (ROM) 58. The RAM 56 and ROM 58 are associated with the control processor 54. The processor 54 has an Ethernet media access controller (MAC) 60 for sending packets from the control processor 54. The processor 54 provides a centralized control to the line card 26. The control processor 54 is connected as shown at 62 to a PSTN vialine input/output interface 64. Interface 64 is a T1/E1 transceiver/framer connected to the PSTN as shown at 66. Interface 64 is partly provided as a highly integrated single chip with two separate (not shown) clock circuits forming most of the interface from the line card 26 to the outside PSTN. The interface 64 may also include a field programmable gate array (not shown) which provides important physical connectivity.

The line card 26 includes a digital signal processor (DSP) complex 68 with a set of six to eight DSPs. This is schematically shown at 70. The six to eight DSPs 70 of the DSP complex 68 along with associated program and data RAMs as well as two Ethernet MACs per DSP are the components used to process signals. FIG. 3 shows the connection of eight DSPs 70 to the interface 64, with a connection shown. Time division multiplexed (TDM) data is sent from the interface 64 to a DSP complex 68 and TDM data is sent to the interface 64 from the DSP complex 68.

The line card 26 has an Ethernet transceiver 72 with an MDI (a MDI-X port may also be used) for connecting the line card via a patch cord to a hub, switch, or router of the Ethernet network 18. Additionally, line card 26 includes a controllable backplane interface 76 connected to the inter chassis repeater bus 14. Ethernet transceiver 72 presents one path by which data may flow out of the line card 26 to the network 18. The controllable backplane interface 76 presents another path by which data may flow out of the line card 26 to the network 18. Additionally, the line card 26 includes an Ethernet repeater complex generally designated 80. The Ethernet repeater complex 80 provides a repeater function from and between the MACs of DSP complex 68, MAC 60 and transceiver element 72 and controllable backplane interface 76. The repeater complex 80 is a set of four Ethernet hubs which are interconnected and connected to a bus or lines 82 connecting to the DSP complex 68, the line 84 connected to Ethernet MAC 60, the line 86 connected to Ethernet transceiver 72 and the intra repeater bus 88. The intra repeater bus 88 connects between Ethernet complex 80 and controllable backplane interface 76.

The controllable backplane interface 76 includes four FET switches which are normally active for normally routing Ethernet traffic from Ethernet repeater complex 80 to the inter chassis repeater bus 14. Data packets can then be received by any other device including devices connected to Ethernet network 18. The packets sent on inter chassis repeater bus 14 may be repeated onto the Ethernet network 18 by the system network card 16 or some other connection. Packets may also be addressed to another device connected to Ethernet network bus 14. The system network card 16 may be a simple repeater such that all network traffic gets sent to the Ethernet network 18. In the alternative, the network card 16 may have a more complicated function including a switching or router function to selectively send packets to the Ethernet network 18, which packets are addressed to a device connected to the Ethernet network 18.

The Ethernet transceiver 72 includes the MDI port at the outside of the digital line card 26. With the card 26 in a slot of the network chassis 10, MDI port has a RJ connector Jack for a patch cord. This provides a connection to the network 18 via a hub or router.

The line card 26 has Ethernet steering logic 90 which receives an interface link signal 92 from the Ethernet transceiver 72. If the media attachment unit (MAU) of the Ethernet transceiver 72, the MDI port, detects a valid link pulse, the interface link status signal 92 is sent to the Ethernet steering logic 90, which changes over from the backplane enable signal to a backplane disable signal. This is then sent to the four FET switches of the controllable backplane interface 76. The four FET switches which are normally active normally routing Ethernet traffic to the intra chassis repeater bus 14, are deactivated. In this way the logic of the Ethernet steering logic 90 validates the MDI port status and then deactivates in the controllable backplane interface 76. If no valid Ethernet link pulse is detected, the Ethernet MAU of Ethernet transceiver 72 will not send data and logic on the backplane 14 via controllable backplane interface 76. The only data path is then by the inter chassis repeater bus 14.

Both the system of the invention and the method of the invention allow an installer to use with two routes for Ethernet traffic depending upon the installation situation. The chassis is provided with an Ethernet backplane path and the line cards 26 are provided with a connection to the backplane path as well as an alternate path to Ethernet network 18 Where the installer determines that insufficient bandwidth is provided by the chassis backplane, the secondary route of Ethernet traffic via the 10BaseT MDI port on the front panel of the digital line card, is the desirable route. This particularly is the case with the chassis provisioned with many or multiple digital line cards 26. In the preferred embodiment, the primary route through the backplane of the chassis is sufficient for one digital line card. When more than one digital line card is provided, at least one card must use the secondary route of the 10BaseT MDI port.

The system of the invention and the digital line card of the invention as well as the method implementing the digital line card provides flexibility for implementation and installation of network systems including telephone network systems. The vendor of the equipment can continue to support customers with chassis having bandwidth limitations while allowing the users to implement digital line cards or other high bandwidth card without the using a new chassis or re-engineering the chassis. Future products which are to be installed in chassis based systems may be provided with run out bandwidth using the multiple route, or multiple path features according to this invention.

While specific embodiments of the invention have been shown and described in detail to illustrate the application of the principles of the invention, it will be understood that the invention may be embodied otherwise without departing from such principles.

What is claimed is:

1. A chassis and card system, comprising:
    a chassis having a slot for receiving a card and having an Ethernet bus for receiving packets from the card and sending packets to the card and having a power supply with a power strip for supplying power to the card;
    a card with a processor and an Ethernet input/output for sending packets over a local network and for receiving packets from the local network, said Ethernet input/output including:
    a controllable backplane interface to said Ethernet bus with a switch normally active to direct data flow between said card and said chassis Ethernet bus, an Ethernet transceiver connectable to the local network; and an Ethernet link signal detector for detecting an Ethernet link signal at said Ethernet transceiver and deactivating said switch to isolate the card from the Ethernet bus and to force data flow through said Ethernet transceiver.

2. A system according to claim 1 comprising:
    a line card for use with a said chassis having a slot for receiving the line card, the chassis having said Ethernet bus for receiving packets from the line card and having said power supply and power strip for supplying power to the line card, the line card comprising:
    a public switched telephone network (PSTN) digital line input/output interface for sending digital signals over the PSTN and for receiving digital signals from PSTN;
    a line card control processor connected to said digital line input/output interface;
    an Ethernet input/output for sending packets over a local network corresponding to signals received from the telephone line and for receiving packets from the local network and forwarding received signals to the digital line input/output interface, said Ethernet input/output of said line card including:
    a controllable backplane interface to said Ethernet bus including a switch normally active to direct data flow between said line card and said Ethernet bus;
    an Ethernet transceiver connectable to an Ethernet network; and
    Ethernet link signal detector for detecting an Ethernet link signal at said Ethernet transceiver and deactivating said switch to isolate the line card from the Ethernet bus and to force data flow through said Ethernet transceiver.

3. A system according to claim 1 comprising:
    a line card for use with a digital signal processor (DSP) complex including a plurality of DSPs receiving time division multiplexing data from said input/output interface and media access controllers (MACs) connected to the DSPs; and
    a MAC connected to said line card control processor, said Ethernet input/output including an Ethernet repeater complex connecting said MACs connected to said DSPs and said MAC connected to said line card control processor to each of said Ethernet transceiver and said controllable backplane interface.

4. A system according to claim 1 comprising:
    a line card, wherein said Ethernet link signal detector includes Ethernet steering logic connected to said Ethernet transceiver for detecting an interface link status signal and connected to said controllable backplane interface and generating backplane enable/disable signal for enabling said controllable backplane interface switch to send packets from each of said MACs connected to said DSPs and said MAC connected to said line card control processor and for disabling said controllable backplane interface switch to isolate the line card from the Ethernet bus.

5. A system according to claim 1, comprising:
    a line card, wherein said controllable backplane interface switch comprises a plurality of FET switches which are normally active and normally route Ethernet traffic to the Ethernet bus.

6. A system according to claim 1, comprising:
    a line card, wherein said digital line input/output interface is a T1/E1 transceiver and framer providing a T1/E1 interface to the outside PSTN.

7. A system according to claim 3, comprising:
    a line card, wherein said digital signal processor complex comprises six to eight DSPs along with associated Program and Data random access memory units (RAMs) as well as two Ethernet MACs per DSP.

8. A system according to claim 1, comprising:

a line card, wherein said Ethernet transceiver includes a 10 Base-T MDI port for connecting the line card to a Hub, switch or router of the Ethernet network via a patch cord.

9. A network system, comprising:

a chassis with slots for receiving cards, the chassis having an Ethernet bus for receiving packets from the cards and sending packets to the cards and having a power supply and power strip for supplying power to the cards; and a line card for use with the chassis including a public switched telephone network (PSTN) line input/output interface for sending signals over the PSTN and for receiving signals from PSTN, a line card control processor connected to said line input/output interface, an Ethernet channel for sending packets over a local network corresponding to signals received from the telephone line and for receiving packets from the local network and forwarding received signals to the line input/output interface, said Ethernet channel including a controllable backplane interface to said Ethernet bus including a switch normally active to direct data flow between said line card and said Ethernet bus, an Ethernet transceiver connectable to the local network and Ethernet link signal detector for detecting an Ethernet link signal at said Ethernet transceiver and deactivating said switch to isolate the line card from the Ethernet bus and to force data flow through said Ethernet transceiver.

10. A system according to claim 9, further comprising:

a digital signal processor (DSP) complex including a plurality of DSPs receiving time division multiplexing data from said input/output interface and media access controllers (MACs) connected to the DSPs, a MAC connected to said line card control processor, said Ethernet channel including an Ethernet repeater complex connecting said MACs connected to said DSPs and said MAC connected to said line card control processor to each of said Ethernet transceiver and said controllable backplane interface.

11. A system according to claim 9, wherein said Ethernet link signal detector includes Ethernet steering logic connected to said Ethernet transceiver for detecting an interface link status signal and connected to said controllable backplane interface and generating backplane enable/disable signal for enabling said controllable backplane interface switch to send packets from each of said MACs connected to said DSPs and said MAC connected to said line card control processor and for disabling said controllable backplane interface switch to isolate the line card from the Ethernet bus.

12. A system according to claim 9, wherein said controllable backplane interface switch comprises a plurality of TET switches which are normally active and normally route Ethernet traffic to the Ethernet bus.

13. A system according to claim 9, wherein said digital line input/output interface is a T1/E1 transceiver and framer providing a T1/E1 interface to the outside PSTN.

14. A system according to claim 10, wherein said digital signal processor complex comprises six to eight DSPs along with associated Program and Data random access memory units (RAMs) as well as two Ethernet MACs per DSP.

15. A system according to claim 9, wherein said Ethernet transceiver includes a 10 BASE-T MDI port for connecting the line card to a Hub, switch or router of the Ethernet network via a patch cord.

16. A network method, comprising the steps of:

providing a chassis with slots for receiving cards, the chassis having an Ethernet bus for receiving packets from the cards and sending packets to the cards and having a power supply and power strip for supplying power to the cards;

connecting a card to the chassis, the card having a processor and an Ethernet channel for sending packets over a local network and receiving packets, said Ethernet channel including a controllable backplane;

connecting a card to the chassis, the card having a public switched telephone network (PSTN) line input/output interface for sending signals over the PSTN and for receiving signals from PSTN, a card control processor connected to said line input/output interface, an Ethernet channel for sending packets over a local network corresponding to signals received from the telephone line and for receiving packets from the local network and forwarding received signals to the digital line input/output interface, said Ethernet channel including a controllable backplane interface to said Ethernet bus including a switch normally active to direct data flow between said card and said Ethernet bus, an Ethernet transceiver connectable to the local network and Ethernet link signal detector for detecting an Ethernet link signal at said Ethernet transceiver and deactivating said switch to isolate the card from the Ethernet bus and to force data flow through said Ethernet transceiver;

connecting another card to the chassis; and connecting the Ethernet transceiver of one of said card to a hub, switch or router of a local network, whereby said card sends packets to said local network via said Ethernet transceiver and said switch of said card is deactivated to isolate said card from the Ethernet bus and to force data flow through said Ethernet transceiver.

* * * * *